United States Patent [19]

Moore

[11] Patent Number: 4,688,908

[45] Date of Patent: Aug. 25, 1987

[54] MICROSCOPE STAGE

[75] Inventor: Derek S. Moore, Acomb, England

[73] Assignee: Vickers PLC, London, England

[21] Appl. No.: 780,677

[22] Filed: Sep. 26, 1985

[30] Foreign Application Priority Data

Oct. 12, 1984 [GB] United Kingdom ............... 8425823

[51] Int. Cl.$^4$ .............................................. G02B 21/26
[52] U.S. Cl. ...................................... 350/531; 33/568
[58] Field of Search ............................. 350/529–533; 310/330; 73/DIG. 4; 33/DIG. 13, 568

[56] References Cited

U.S. PATENT DOCUMENTS

| | | | |
|---|---|---|---|
| 3,563,186 | 2/1971 | Piper | 350/531 |
| 3,870,416 | 3/1975 | Brady et al. | 350/531 |
| 4,336,657 | 6/1982 | Iwasaki | 33/DIG. 13 |
| 4,559,717 | 12/1985 | Scire et al. | 350/531 |
| 4,565,094 | 1/1986 | Sedgewick | 33/568 |

FOREIGN PATENT DOCUMENTS

| | | | |
|---|---|---|---|
| 2129955 | 5/1984 | United Kingdom | 350/530 |
| 158684 | 1/1963 | U.S.S.R. | 33/DIG. 13 |

OTHER PUBLICATIONS

Aronstein et al, "Frictionless X, Y, Z and Theta Micropositioning Table", IBM Tech. Disc. Bull. 5-1973, p. 3889.

Gall et al, "An Electrical Micrometer", Jr. of Scientific Instruments, 11-1945, p. 219.

Rabstejnek, C. V. "Step & Repeat Micropositioning Table", IBM Tech. Disc. Bull. 4-1970, pp. 1958-1959.

Primary Examiner—William H. Punter
Attorney, Agent, or Firm—Wood, Dalton, Phillips, Mason & Rowe

[57] ABSTRACT

There is disclosed a microscope having improved means for determining precisely the position of a specimen in relation to the microscope. The microscope comprises a base, a mounting stage for holding a specimen, a microscope objective for viewing the specimen, mounting means adjustably mounting the mounting stage on the base for altering the position of the specimen relative to the microscope objective; and displacement means coupled with the mounting stage for moving the latter relative to the base. The mounting means comprises a flexure mounting, and a strain gauge provided on the flexure mounting for monitoring the extent of flexure of the mounting when the mounting stage is displaced by the displacement means.

8 Claims, 5 Drawing Figures

MICROSCOPE STAGE

This invention relates to a microscope having an adjustable mounting stage for holding a specimen, and is particularly concerned with means of precisely determining the position of the mounting stage in relation to the microscope.

The invention has application to the precise measurement of objects under the microscope, and also to precision scanning of objects under the microscope for image processing purposes.

The mounting stages of optical microscopes are commonly positioned by means of calibrated micrometer screws with resolution of the setting limited to about one micrometer. Such stages can be fitted with incremental encoders giving a setting resolution of about 0.01 micrometer. Higher precision can be obtained by employing a laser interferometer to measure the stage displacement. Here a resolution of about 0.04 micrometers can be obtained.

Higher setting resolutions may be obtained by means of piezo-electric displacement transducers, but these devices exhibit hysteresis which degrades the precision or repeatability of stage positioning.

The present invention therefore seeks to provide improved methods and means of adjusting a microscope stage, and of determining the displacement of the stage.

SUMMARY OF THE INVENTION

According to the invention there is provided a microscope having a base, a mounting stage for holding a specimen and which is adjustably mounted on said base for altering the position of a specimen relative to the objective of the microscope, and displacement means coupled with the mounting stage for moving the latter relative to the base, in which:

the mounting stage is mounted on the base via a flexure mounting; and a strain gauge is provided on said flexure mounting for monitoring the extent of flexure of the mounting when the mounting stage is displaced by the displacement means.

The invention has been developed primarily in relation to an optical microscope, but it should be understood that the inventive features referred to above may also be applied to other microscopes, including electron microscopes.

The strain gauge provides an electrical measure of the amount of flexure of the mounting of the mounting stage, thereby providing an electrical measure of the displacement of the mounting stage.

When the microscope is intended to be used for precise measurements, preferably an indicator is provided for indicating the position and/or extent of displacement of the mounting stage. The displacement indicator may be coupled with the strain gauge, and suitably calibrated to provide a visual read-out of the extent of displacement, or the position of the mounting stage.

However, when the microscope is applied to precision scanning of objects for image processing purposes, an indicator is not required. Preferably, one or more strain gauges are arranged to provide an electrical signal, the instantaneous value of which provides the information relating to the position of the mounting stage at that instant in time. This positional information may be stored in a computer together with the corresponding instantaneous values of light intensity so that image processing may be carried out.

Preferably, the strain gauge (or a plurality of strain gauges) forms a part of a closed loop feedback system, whereby mounting stage displacement is controlled to be directly proportional to an input command signal to the system.

The flexure mounting for the mounting stage may take any convenient form. In its simplest form, the flexure mounting may comprise a single flexure suspension arrangement by means of which the mounting stage is suspended above the microscope base. The suspension arrangement preferably is formed by a pair of support strips arranged one at or near each end of the mounting stage, and the strain gauge is mounted on either one of the support strips, preferably adjacent to the region thereof which undergoes the greatest extent of flexion during adjustment of the mounting stage.

If desired, the flexure mounting may be formed by a plurality of flexure suspension arrangements. Also, more than one strain gauge may be provided on the flexure mounting, to provide a composite signal representative of the extent of displacement of the mounting stage.

The adjustable displacement of the mounting stage relative to the microscope objective may be in any desired plane of movement. Thus, the movement of the mounting stage may be a traversing movement in a plane (usually a horizontal plane) perpendicular to the optical axis of the microscope.

If desired, two sets of flexure mountings and corresponding displacement means may be provided, one set serving for movement of the mounting stage along one direction and the other set serving for movement in the same plane but in an orthogonal direction. A first set of the flexure mountings may be coupled directly with the mounting stage and indirectly with the microscope base via an intermediate movable stage. The second set of the flexure mountings is connected between the intermediate movable stage and the microscope base, whereby the mounting stage can be displaced in two mutually orthogonal directions in the same plane.

Preferably, the displacement means is coupled directly with the mounting stage, to exert adjustable displacement movement thereon, though the displacement means may be coupled indirectly with the mounting stage by having a drive connection with the flexure mounting.

The displacement means may take any suitable power-operated form for applying accurately very small increments of adjustment movement to the mounting stage. The displacement means may comprise an electrical transducer in the form of a piezo-electric displacement device, a limited angle torque motor or a moving coil displacement device. When the displacement means is coupled directly with the movable mounting stage, this may be by way of a tensioned wire, tape or other elongate tensile element, whereby uni-directional displacement forces can be applied to the mounting stage.

For a better understanding of the invention, and to show how the same may be carried into effect, reference will now be made, by way of example, to the accompanying drawings.

DESCRIPTION OF PREFERRED EMBODIMENT

Figure 1:
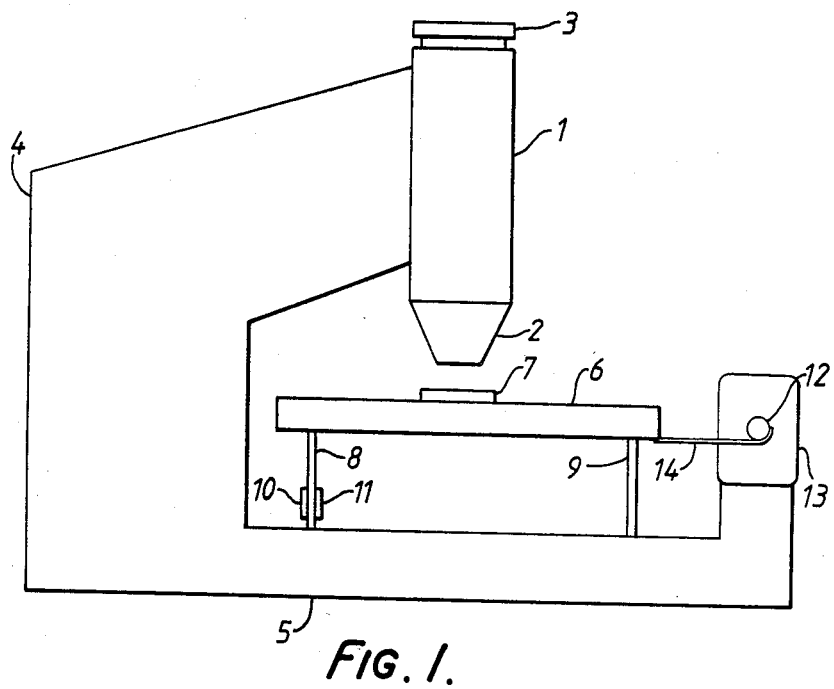
FIG. 1 shows diagrammatically a view in elevation of an optical microscope according to the invention with an adjustable mounting stage supported on two flexure suspensions, one of which carries a pair of strain gauges.

FIG. 1 shows an optical microscope 1, comprising a conventional objective 2 and an eyepiece 3, which is mounted rigidly on a base 5 via a limb 4. A mounting stage 6 holds a specimen 7 for examination under the objective 2. The mounting stage 6 is adjustably mounted on the base 5 by means of a flexure mounting in the form of strip flexure suspensions 8 and 9, on one of which suspensions is mounted a pair of strain gauges 10 and 11. The mounting stage 6 is displaceable relative to the base 5 by displacement means in the form of a limited angle torque motor 13 having a shaft 12 coupled with the stage 6 by means of a metal tape or wire 14.

In use, a current supplied to the limited angle torque motor 13 will give rise to a torque at the shaft 12 proportional to that current. This torque will produce a change in the tension in the metal tape 14, causing a displacement of the mounting stage 6 and specimen 7 and flexion of the strip flexure suspensions 8 and 9. An electrical measure of the degree of flexion, and therefore of the displacement of the mounting stage 6 and specimen 7, will be provided by the strain gauges 10 and 11 which are mounted on opposing faces of one (8) of the strip flexure suspensions, preferably in the area of maximum bending.

Figure 2:
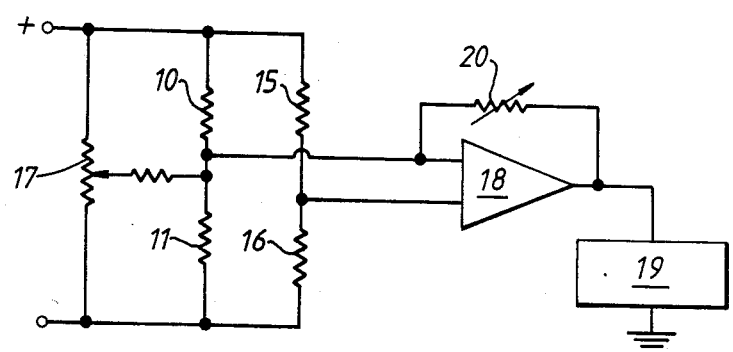
FIG. 2 shows a diagram of an electrical circuit in which the two strain gauges may be connected when the device is in use.

FIG. 2 shows a diagram of an electrical circuit in which the two strain gauges may be connected when the device is in use. The strain gauges 10 and 11 are connected in a bridge network with two precision resistors 15 and 16 as the ratio arms. A potentiometer 17 is provided so that the bridge network can be balanced for zero output at any given displacement of the mounting stage. The output from the bridge network is amplified by an operational amplifier 18 and then fed to a displacement indicator comprising a digital voltmeter 19, which indicates the position and/or displacement of the mounting stage 6. The amplifier gain is controlled by a variable resistance 20 so that the device may be calibrated to read out directly in some convenient units of displacement.

Circuit arrangements other than that shown in FIG. 2 may of course be used. For example, the precision resistors 15 and 16 may be replaced by two further strain gauges attached to the strip flexure suspension so that the bridge network is made up from four active strain gauges.

Figure 3:
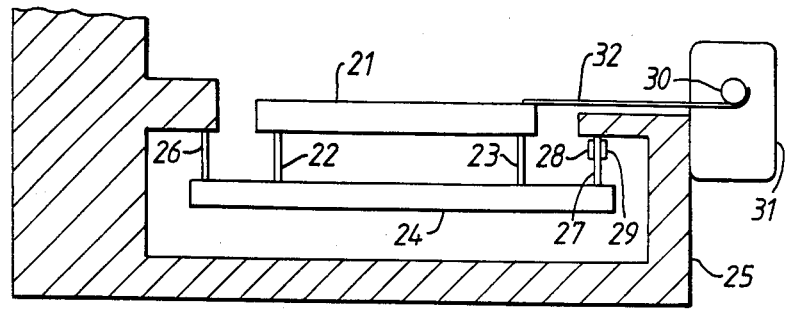
FIG. 3 shows diagrammatically a view in elevation of an adjustable mounting stage supported on flexure suspensions providing a compound parallel movement for true rectilinear motion.

FIG. 3 shows diagrammatically a view in elevation of an alternative arrangement of the present invention whereby a compound parallel movement is employed so that true rectilinear motion of the mounting stage may be obtained. Here a mounting stage 21 is carried on flexure suspensions 22 and 23, the other ends of said flexure suspensions being attached to an intermediate rigid member 24. The intermediate rigid member 24 is supported from the base 25 of the optical microscope by further flexure suspensions 26 and 27, which are preferably identical in form and material to flexure suspensions 22 and 23. A pair of strain gauges 28 and 29 are mounted on opposing faces of one of the four flexure suspensions, preferably in the area at which maximum bending occurs at that flexure suspension during displacement of the mounting stage 21. The mounting stage 21 is connected to the shaft 30 of a limited angle torque motor 31 by means of a metal tape or wire 32, the limited angle torque motor being attached to the base 25 of the optical microscope.

In order to be able to displace a specimen under an optical microscope in two mutually orthogonal directions, a mounting stage as previously disclosed in FIG. 1 or FIG. 3 can be mounted upon a second mounting stage, this second stage being arranged so that the direction of displacement is orthogonal to the direction of displacement of the first stage.

FIG. 1 and 3 show arrangements in which generally horizontal traversing adjustment of a mounting stage is possible, relative to the microscope objective. However, referring now to FIG. 4, there is shown diagrammatically a view in elevation of an arrangement of the present invention whereby relative vertical displacement of a mounting stage may be obtained. Such an arrangement finds application, for example, in enabling focussing of a specimen to be achieved under an optical microscope. Here a mounting stage 33 is mounted on the base of the microscope via an adjustable flexure mounting by being carried on strip flexure suspensions 34 and 35, the other ends of said flexure suspensions being attached to similar flexure suspensions 36 and 37 respectively. Four strain gauges 38, 39, 40 and 41 are attached as shown to one pair of the flexure suspensions, preferably in the areas at which maximum bending occurs during displacement of the mounting stage 33. The other ends of flexure suspension 36 and 37 are attached to a rigid member 42 which is mounted on the base of the optical microscope.

The mounting stage 33 is connected to the shaft 43 of a limited angle torque motor 44 by means of a metal tape or wire 45, the limited angle torque motor being attached to the rigid member 42.

In use, a current supplied to the limited angle torque motor 44 will give rise to a torque at the shaft 43 proportional to that current. This torque will produce a change in tension in metal tape 45, causing a vertical displacement of the mounting stage 33 and flexion of the strip flexure suspensions 34, 35, 36 and 37. An electrical measure of the degree of flexion and therefore of the displacement of the mounting stage 33 will be provided by the strain gauges 38, 39, 40 and 41 which are connected to an electrical bridge network.

Figure 4:
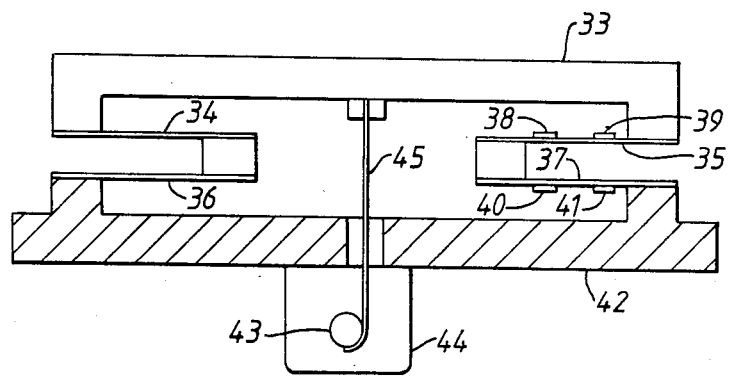
FIG. 4 shows diagrammatically a view in elevation of an arrangement of the present invention whereby a vertical displacement of a mounting stage may be obtained.

If desired, the vertical adjustment of the mounting stage, provided by the arrangement of FIG. 4, may be combined with horizontal adjustment provided by the arrangements of FIGS. 1 or 3.

Other displacement means than the torque motors may be provided for displacing the mounting stage. For example, a piezo-electric displacement device, or a moving coil displacement device may be provided.

Figure 5:
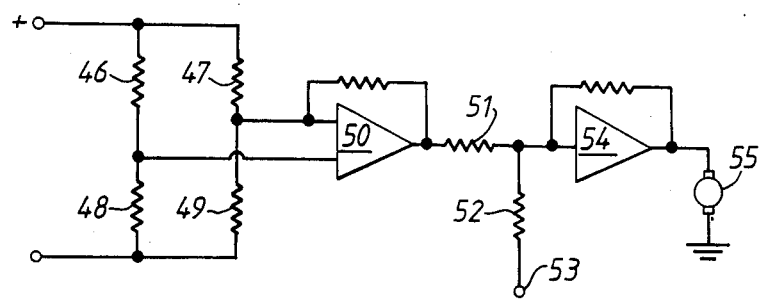
FIG. 5 shows a diagram of an electrical circuit in which the strain gauges and torque motor are arranged in the form of a closed loop feedback system.

FIG. 5 shows a diagram of an electrical circuit for controlling the operation of the embodiments of the present invention, and taking the form of a closed loop feedback system so that the mounting stage displacement is controlled to be directly proportional to an input command voltage signal. Here strain gauges 46, 47, 48 and 49 are connected in the form of a bridge network feeding an amplifier 50. The output from amplifier 50 is fed through resistance 51 to the input of a second amplifier 54 which feeds a torque motor 55. Also connected to the input of amplifier 54 is a resistance 52, the other end of said resistance being connected to an input terminal 53. Torque motor 55 is connected to the mounting stage (as previously disclosed) and strain gauges 46, 47, 48 and 49 are attached to a strip flexure suspension of the mounting stage as previously disclosed.

In use a command voltage is applied to input terminal 53 and compared with the output of amplifier 50 through the summing resistances 52 and 51 at the input amplifier 54. Any difference voltage at the input of amplifier 54 is amplified and fed to torque motor 55 which displaces the mounting stage, causing a change in the output from the bridge network comprising strain gauges 46, 47, 48 and 49. The mounting stage will in this way be displaced until the voltage at the output of amplifier 50 is sufficient to bring the difference voltage at the input to amplifier 54 to zero. In this way the displacement of the mounting stage is controlled to be directly proportional to the input command voltage. Although not shown in FIG. 5, a displacement indicator may be connected to the circuit to provide a visual read-out of the extent of displacement, or position, of the mounting stage.

The disclosed embodiments of the present invention have the following desirable features:

1. A high resolution of displacement setting can be obtained with a precision of setting of the order of 0.01 micrometers being readily achievable.

2. The measurement of the mounting stage displacement is devoid of errors due to backlash or hysteresis.

3. The precision of measurement of displacement is not degraded by wear of moving parts.

4. An easily read digital display of the mounting stage displacement is readily obtained.

5. The mounting stage may be driven in order to scan a specimen under the microscope for image processing purposes. Here the strain gauges provide an electrical signal, the instantaneous value of which provides the information relating to the position of the mounting stage at that instant in time.

6. Substantial linearity can be achieved in the relationship in input current to the torque motor (13, 31, 44, 55) and the displacement (horizontal or vertical) of the mounting stage.

The described embodiments disclose adjustment of a specimen mounting stage relative to the objective of an optical microscope. Although not shown, it should be appreciated that the mounting stage adjustment, and the monitoring thereof, for an optical microscope can readily be provided in other microscopes, including electron microscopes.

I claim:

1. A microscope for examining a specimen, having:
   a base;
   a mounting stage, having two sides, for holding the specimen;
   a microscope objective having a focussing axis, for viewing the specimen on the mounting stage;
   mounting means adustably mounting the mounting stage on the base;
   a strain gauge mounted on said mounting means;
   and displacement means coupled with the mounting stage, for adjusting the mounting stage by moving it relative to the base to alter the position of the specimen along the focussing axis;
   said mounting means comprising a first flexure suspension and a second flexure suspension; the first and second flexure suspensions each being in the form of a strip having two ends and aligned perpendicular to the focussing axis, the first flexure suspension being fixed at one end to the mounting stage, and fixed at the other end to the second flexure suspension; the second flexure suspension being fixed at one end to the first flexure suspension and fixed at the other end to the base, whereby the mounting stage is mounted on the base; and wherein the strain gauge is mounted on one of the flexure suspensions at a region thereof which undergoes a relatively large extend of flexion during adjustment of the mounting stage.

2. A microscope according to claim 1, including a further said mounting means, the first flexure suspensions of said and said further mounting means being fixed to respective sides of the mounting stage.

3. A microscope according to claim 1, including a displacement indicator connected to the strain gauge for indicating the position and/or extend of displacement of the mounting stage.

4. A microscope according to claim 1, including an electrical closed loop feedback system in which said strain gauge is arranged, said system being arranged to control mounting stage displacement so as to be directly proportional to an input command to the system.

5. A microscope according to claim 1, in which the displacement means is connected to the mounting stage via an elongate tensile element.

6. A microscope according to claim 1, in which the displacement means comprises a limited angle torque motor.

7. A microscope according to claim 1, including a further strain guage, which is mounted to the same one of the flexure suspensions as said strain gauge, at another region thereof which undergoes a relatively large extent of flexion during adjustment of the mounting stage.

8. A microscope according to claim 1, including another strain gauge, which is mounted to the flexure suspension fixed to that one mounting said strain gauge.

* * * * *